A. N. EATON.
TANK HEATER.
APPLICATION FILED DEC. 1, 1915.

1,170,518. Patented Feb. 8, 1916.

Witness
Jane Hoech
Hiram A. Sturges.

Inventor
Albert N. Eaton
By Arthur H. Sturges.
Attorney

UNITED STATES PATENT OFFICE.

ALBERT N. EATON, OF OMAHA, NEBRASKA.

TANK-HEATER.

1,170,518.	Specification of Letters Patent.	Patented Feb. 8, 1916.

Application filed December 1, 1915. Serial No. 64,439.

*To all whom it may concern:*

Be it known that I, ALBERT N. EATON, a citizen of the United States, residing at Omaha, in the county of Douglas and State of Nebraska, have invented certain new and useful Improvements in Tank-Heaters, of which the following is a specification.

Stock watering tanks used by farmers are generally so exposed during cold weather that the resulting formation of ice prevents the stock from obtaining the water.

The present invention relates to improvements in heaters for use in connection with these tanks to maintain the temperature of the water at a higher degree than freezing, which will be convenient, durable and of simple construction.

The invention has reference to such an arrangement of parts that an adequate heating surface may be maintained in the water at desired depths so that it may be used to advantage in connection with tanks of different sizes, also to such a control that a substantially uniform degree of heat may be maintained, and the use of a combined grate-support and ash remover found to be of advantage.

With the above and other objects in view, the invention consists of the novel features of construction, combination and arrangement of parts as hereinafter described and pointed out in the appended claims.

It will be understood that the accompanying drawing illustrates only one embodiment of the invention, and no limitation is necessarily made as to the precise structural details shown; and the right is reserved to make any changes, alterations and modifications to which recourse may be had that come within the scope of the invention, as expressed in the claims, without departing from the spirit of the invention.

Figure 1:
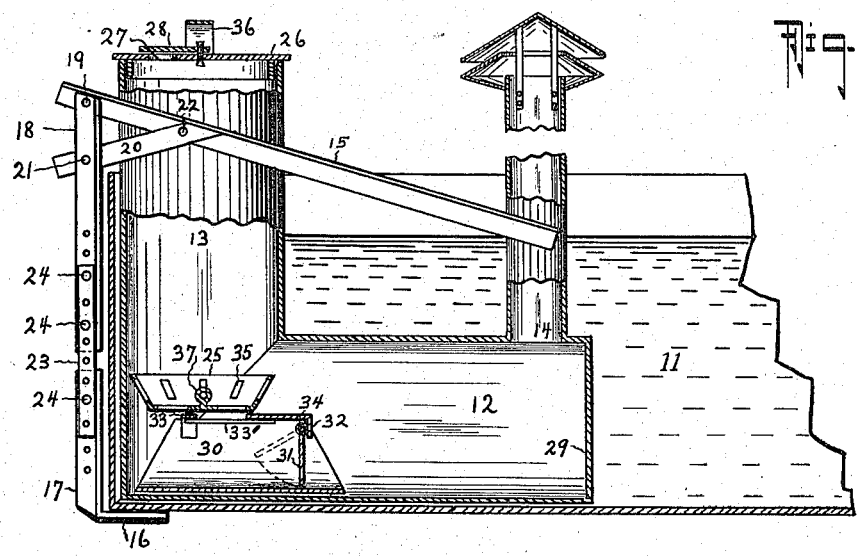
Figure 2:
Figure 4:
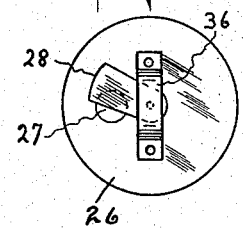
Figure 5:
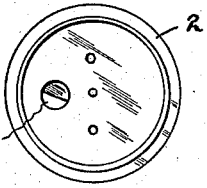
Figure 9:
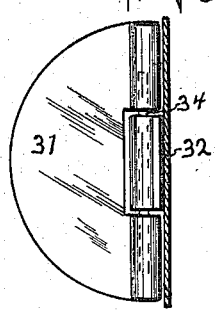
Figure 6:
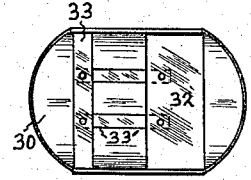
Figure 7:
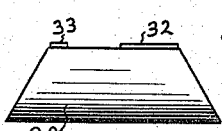
Figure 10:
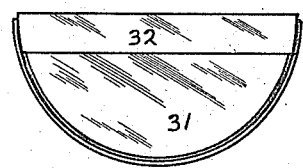
Figure 3:
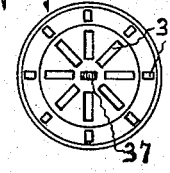
Figure 8:
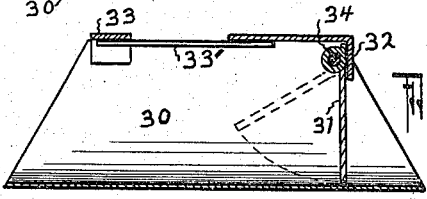

In the drawing, Figure 1 shows a watering tank partly broken away, being a vertical section thereof, a heater also being shown therein, partly in section. Fig. 2 is a side view of a hook for use in connection with the heater. Fig. 3 is a plan view of the grate for the heater. Fig. 4 is a plan view of the stoke-hole cover. Fig. 5 is a bottom plan view of said cover. Figs. 6 and 7, respectively are plan and side views of the ash scoop. Fig. 8 is a view of the ash scoop in longitudinal section. Fig. 9 is a detail section through the scoop, showing the hinged door in elevation. Fig. 10 is a rear end view of the ash scoop.

Referring now more particularly to the drawing, numeral 11 indicates a stock watering tank which may be of any desired form. The heater forming the subject matter of the invention, is adapted to be placed within the tank and submerged so that all of the water may be heated to such a degree that freezing will be prevented.

The heating receptacle consists of a horizontal, cylindrical casing 12 having a closed free end 29. Secured to the opposite open end of the section 12 is a vertical section 13 substantially similar to the horizontal section 12 and which provides, throughout its length, a stoke hole in communication with the inner end of the section 12. The section 12 is provided, near its closed end with a chimney or flue 14 of sufficient height to cause a proper draft. It will be understood that the vertical and horizontal sections are so connected at their inner ends that the receptacle thus provided will be "water tight", said connection being accomplished by suitable welding, and the flue 14 is similarly connected with section 12.

On account of the buoyancy of the heater or receptacle, means are provided for maintaining it at desired depths in the water, this feature being desirable since watering tanks are manufactured of various sizes, and in order to effectively heat the water, the receptacle should be maintained, in some instances, considerably below the surface of the water. To provide means for the adjustments mentioned, and for supporting the section 12 in a horizontal position, and also to prevent any lateral swinging movements of the receptacle, certain devices are employed, consisting, in part, of an alining bar or supporting plate 15 having its outer end welded to the flue 14, said bar also being welded near its inner end to the wall of the vertical section.

An L-shaped bracket is provided consisting of a horizontal toe-clip 16 and a standard or vertical part 17, said bracket being so disposed that the toe clip extends under the bottom of the tank to which it is held by the weight of said tank, or may be detachably secured thereto by any suitable means, the vertical part 17 being disposed adjacent to the side of the tank and provided with numerous apertures as shown.

At 18 is indicated a vertically disposed arm. It is secured at its upper end, by means of the pin 19, to the bar 15. A brace bar 20 is provided which is connected with the bar 15 and the arm 18 by means of the respective pins 21 and 22. At 23 is indicated an adjusting-plate. It is provided with a plurality of spaced apertures which are adapted to register with the apertures of the vertical portion 17 of the bracket and with the apertures in the lower end of the arm 18 when mounting said plate 23 upon members 17 and 18, bolts 24 being provided for this purpose. By this adjustable connection it is obvious that the heater may be maintained near the bottom or at any desired altitude within the tank, and lateral swinging movements prevented.

Arranged within the heater is a removable grate 25 to contain coal or wood for the fire, and disposed over the stoke hole is a cover 26 having, near its middle, an opening 27 which may be closed wholly or in part by the swing-door 28, for regulating the draft for the grate.

The heaters as described are required to be of various lengths so that a suitable warming surface may be provided, and when wood is used as fuel the ashes will accumulate in the horizontal section 12, near its outer end 29. To facilitate removal of these ashes, a scoop 30 is provided. In order that the scoop may provide a suitable support for the grate it is formed semi-circular in cross section, its transverse curvature conforming to the curvature of section 12 and adapted to rest upon the bottom of said section.

One end of the scoop is adapted, normally, to be closed by a door 31 which may be swung inwardly as indicated by dotted lines in Figs. 1 and 8, its outward movement being limited by means of the angular cross-plate 32. The sides of the scoop are further braced by the transverse bar 33, and the bars 32 and 33 are connected by the pair of longitudinally extending bars 33'. The door 31 is hinged to the plate 32, its pintle being indicated at 34. As shown in Fig. 1, it will be noted that the grate 25 is disposed above and is supported by the scoop 30, and is provided with draft apertures 35.

The cover 26 for the stoke hole is provided with a handle 36 and may be readily removed when supplying the grate with fuel, or to permit access to the interior of the heater for removing the ashes. The grate is provided with an eyelet 37 at the middle thereof for inserting the hook 38 when it is desired to remove the grate from the heater or deposit it therein.

Since the ashes have a tendency to accumulate near the end 29 of the horizontal section, the scoop, and its particular construction have been found to be necessary for removal of such accumulations. In operation, after the grate has been removed from its seating upon members 32 and 33 of the scoop, said scoop may be forcibly moved toward said end 29 by means of the hook 38, and when moving the scoop in the direction described the resistance of the ashes will cause the hingeably mounted door 31 to move inwardly of the scoop, as indicated by the broken lines, and by pulling the scoop in the opposite direction, the weight of the ashes will cause the door 31 to close, and the ashes remaining within the scoop will be retained therein while said scoop is being lifted out through the stoke hole.

In instances where oil or similar fuel is used, the particular arrangement for the grate and scoop may be dispensed with, but in practice, straw, brush, dried corn stalks or manure and wood, all of which may be readily found upon farms or where stock is kept, are generally employed, and the arrangement mentioned has been found to be convenient and of advantage.

Having fully described the invention and its several parts, any further explanation relating to operation is not necessary.

What I claim as my invention and desire to secure by Letters Patent is,—

1. A heater for watering tanks comprising a tubular receptacle having a horizontal and a vertical portion, a scoop adapted to rest within the horizontal portion, a grate adapted to be supported upon said scoop, a door hingedly mounted within one end of said scoop, and means for securing said tubular receptacle to the wall of the tank while disposed therein.

2. A device for the purpose described, comprising, in combination with a tank for containing water, a receptacle having an imperforate horizontal part provided with a flue and a vertical part provided with a cover, a scoop within said horizontal part, a grate detachably mounted on the scoop, and an L-shaped bracket adapted to have a connection at one of its ends with the vertical part of the receptacle with its opposite end in engagement with the bottom of the tank for maintaining the imperforate horizontal part of the receptacle against the force of buoyancy while disposed in the water of said tank.

In testimony whereof, I have affixed my signature in presence of two witnesses.

ALBERT N. EATON.

Witnesses:
H. Don Clarke,
Hiram A. Sturges.

Copies of this patent may be obtained for five cents each, by addressing the "Commissioner of Patents, Washington, D. C."